United States Patent
Nakamura (10) Patent No.: US 7,156,083 B2
(45) Date of Patent: Jan. 2, 2007

(54) CONTROL APPARATUS AND METHOD FOR INTERNAL COMBUSTION ENGINE

(75) Inventor: Munenori Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/354,818

(22) Filed: Feb. 16, 2006

(65) Prior Publication Data

US 2006/0190161 A1  Aug. 24, 2006

(30) Foreign Application Priority Data

Feb. 18, 2005  (JP) .............................. 2005-042596

(51) Int. Cl.
  *F02P 11/00* (2006.01)
  *F02P 11/06* (2006.01)

(52) U.S. Cl. .................................... 123/631; 123/90.17

(58) Field of Classification Search ............ 123/90.15, 123/90.17, 603, 631, 179.3, 179.5; 701/114
See application file for complete search history.

(56) References Cited

U.S. PATENT DOCUMENTS

| | | | |
|---|---|---|---|
| 5,778,862 A * | 7/1998 | Fukui ........................ | 123/631 |
| 6,016,789 A * | 1/2000 | Denz et al. ............. | 123/406.62 |
| 6,119,641 A * | 9/2000 | Koch et al. ............. | 123/90.17 |
| 6,782,860 B1 * | 8/2004 | Makajima et al. ....... | 123/179.3 |
| 7,079,939 B1 * | 7/2006 | Kataoka et al. ............ | 701/112 |
| 2003/0106364 A1 * | 6/2003 | Kimata et al. ............. | 73/118.1 |
| 2006/0042578 A1 * | 3/2006 | Izumi et al. ............. | 123/90.17 |

FOREIGN PATENT DOCUMENTS

| | | |
|---|---|---|
| JP | B2 6-50107 | 6/1994 |
| JP | A 10-220330 | 8/1998 |
| JP | A 2000-104619 | 4/2000 |
| JP | A 2004-150397 | 5/2004 |

* cited by examiner

*Primary Examiner*—Mahmoud Gimie
(74) *Attorney, Agent, or Firm*—Oliff & Berridge, PLC (57) ABSTRACT

A control apparatus for an internal combustion engine includes a crankshaft, a camshaft for actuating a valve of the engine, and a rotating electrical machine that is coupled to one of the crankshaft and the camshaft. The apparatus includes a computer that controls the rotating electrical machine. The rotating electrical machine includes a rotor and a plurality of rotation sensors, each of which outputs a signal corresponding to induced voltage generated by rotation of the rotor. The computer controls the rotating electrical machine based on the signals from the rotation sensors, and detects the occurrence of reverse rotation in the engine when an output pattern of the signals from the rotation sensors is different from an output pattern during forward rotation of the engine. As a result, the apparatus promptly detects the occurrence of reverse rotation of the internal combustion engine without providing additional sensors or rotors.

12 Claims, 5 Drawing Sheets

CONTROL APPARATUS AND METHOD FOR INTERNAL COMBUSTION ENGINE

BACKGROUND OF THE INVENTION

The present invention relates to a control apparatus and a method for an internal combustion engine.

When an internal combustion engine such as an engine for an automobile is stopped in a normal operation, fuel injection and ignition in the internal combustion engine are stopped as a driver turns off the ignition switch. As a result, the engine rotation speed is gradually reduced by the rotational resistance caused by, for example, the pressure in each combustion chamber during a compression stroke. After the internal combustion engine rotates in reverse once by the pressure in the combustion chambers, the engine rotation finally stops.

However, if the internal combustion engine is stopped before achieving fully autonomous operation because of an operational error of the ignition switch while the engine is being started, or if the engine is stopped by a stall during operation, that is, when the internal combustion engine is stopped because of abnormality, fuel injection and ignition are continued in order to achieve autonomous operation while the rotation speed is reduced during an engine stopping process. Therefore, fuel injection and ignition are performed during reverse rotation of the engine in the engine stopping process. This could lead to failure of the internal combustion engine due to combustion of fuel in a reverse rotation state.

To avoid such a problem, ignition of the engine is prohibited when the engine rotation speed is reduced to a level (for example, 200 rpm) that could stop the engine rotation during operation of the internal combustion engine. In this case, during the stopping process performed when the internal combustion engine is stopped because of abnormality, ignition is prohibited when the engine rotation speed becomes less than the above mentioned level. Therefore, ignition is not performed during reverse rotation of the internal combustion engine in the stopping process, and combustion of fuel in the reverse rotation state is avoided.

During cranking or autonomous operation of the internal combustion engine, even if the engine rotation speed is reduced to below the above mentioned level for some reason, ignition is preferably continued to achieve autonomous operation from that point until reverse rotation is caused. However, when the ignition is prohibited, the possibility of achieving autonomous operation of the internal combustion engine is eliminated due to the prohibition of ignition during the period from when the engine rotation speed is reduced to below the above mentioned level until reverse rotation is performed. That is, ignition is prohibited more than necessary.

Also, if reverse rotation of the internal combustion engine is detected, ignition can be suppressed from being prohibited more than necessary as described above by prohibiting ignition only when the internal combustion engine rotates in reverse. Therefore, it has been proposed that reverse rotation of the engine be detected using a crank signal or a cam signal of the internal combustion engine.

The crank signal is a signal used for, for example, detecting the crank angle of the internal combustion engine, and is output from a crank position sensor in the vicinity of a crank rotor attached to the crankshaft in accordance with rotation of the crankshaft at, for example, every 10° of crank angle. That is, the shape of the crank rotor is designed such that the crank signal is output from the crank position sensor at equal intervals.

Meanwhile, the cam signal is used for distinguishing cylinders of the internal combustion engine, and is output from a cam position sensor in the vicinity of a cam rotor attached to the camshaft at unequal intervals with respect to constant rotation of the camshaft. That is, the shape of the cam rotor is designed such that the cam signal is output in such a manner from the cam position sensor. The cylinders of the internal combustion engine are distinguished based on the cam signal and the crank signal. The output intervals of the cam signal are normally set longer than the output intervals of the crank signal. This is because the cam signal is used only for distinguishing the cylinders, and does not need to be output at a short interval such as 10° CA like the crank signal.

When the internal combustion engine is rotated in reverse, the output pattern of the crank signal output at equal intervals of every 10° of crank angle is not changed from that during forward rotation, but the output pattern of the cam signal output at unequal intervals becomes different from that during forward rotation. Therefore, the occurrence of reverse rotation of the engine is detected based on the change in the output pattern of the cam signal with respect to the crank signal due to reverse rotation of the internal combustion engine.

However, since the output intervals of the cam signal are relatively long as described above, it takes time for the influence of reverse rotation to appear in the output pattern of the cam signal from when the internal combustion engine is actually rotated in reverse. Therefore, by the time the occurrence of reverse rotation of the internal combustion engine is detected, reverse rotation may already be advanced and ignition in such a state may have been performed. To avoid such a circumstance, a cam rotor having a shape that shortens the output intervals of the cam signal may be used. However, in this case, an additional cam rotor needs to be prepared. This is inevitably troublesome and costly.

Instead of using the cam rotor having the above mentioned shape, the occurrence of reverse rotation of the internal combustion engine may be detected by applying a technique disclosed in Japanese Laid-Open Patent Publication No. 10-220330. In the above publication No. 10-220330, two crank position sensors are provided. The sensors are arranged such that the crank signals are alternately output from the two crank position sensors during forward rotation of the engine. Then, the occurrence of reverse rotation of the internal combustion engine is detected when the crank signals are output several times from one of the crank position sensors while the crank signal is output from the other crank position sensor. Therefore, by applying the technique of the above publication No. 10-220330, the occurrence of reverse rotation of the internal combustion engine is detected without changing the cam rotor with the one for detecting reverse rotation.

As described above, when the occurrence of reverse rotation of the internal combustion engine is detected by applying the technique of the above publication No. 10-220330, the occurrence of reverse rotation of the internal combustion engine is detected without changing the cam rotor with the one for detecting reverse rotation. However, two crank position sensors need to be provided to detect the occurrence of reverse rotation of the internal combustion engine. This causes trouble to provide an extra crank position sensor and increases in the costs.

SUMMARY OF THE INVENTION

Accordingly, it is an objective of the present invention to provide a control apparatus and a method for an internal combustion engine that promptly detects the occurrence of reverse rotation of the internal combustion engine without providing additional sensors or rotors.

To achieve the foregoing and other objectives and in accordance with the purpose of the present invention, a control apparatus for an internal combustion engine is provided. The engine includes a crankshaft, a camshaft for actuating a valve of the engine, and a rotating electrical machine that is coupled to one of the crankshaft and the camshaft. The apparatus includes a computer that controls the rotating electrical machine. The rotating electrical machine includes a rotor and a plurality of rotation sensors, each of which outputs a signal corresponding to induced voltage generated by rotation of the rotor. The computer controls the rotating electrical machine based on the signals from the rotation sensors, and detects the occurrence of reverse rotation in the engine when an output pattern of the signals from the rotation sensors is different from an output pattern during forward rotation of the engine.

The present invention also provides a control method for an internal combustion engine. The engine includes a crankshaft, a camshaft for actuating a valve of the engine, a rotating electrical machine that is coupled to one of the crankshaft and the camshaft. The method includes: outputting, from a plurality of rotation sensors, signals corresponding to induced voltage generated by rotation of a rotor of the rotating electrical machine; controlling the rotating electrical machine based on the signals from the rotation sensors; and detecting the occurrence of reverse rotation in the engine when an output pattern of the signals from the rotation sensors is different from an output pattern during forward rotation of the engine.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An automobile multi-cylinder engine 1 according to one embodiment of the present invention will now be described with reference to FIGS. 1 to 5.

Figure 1:
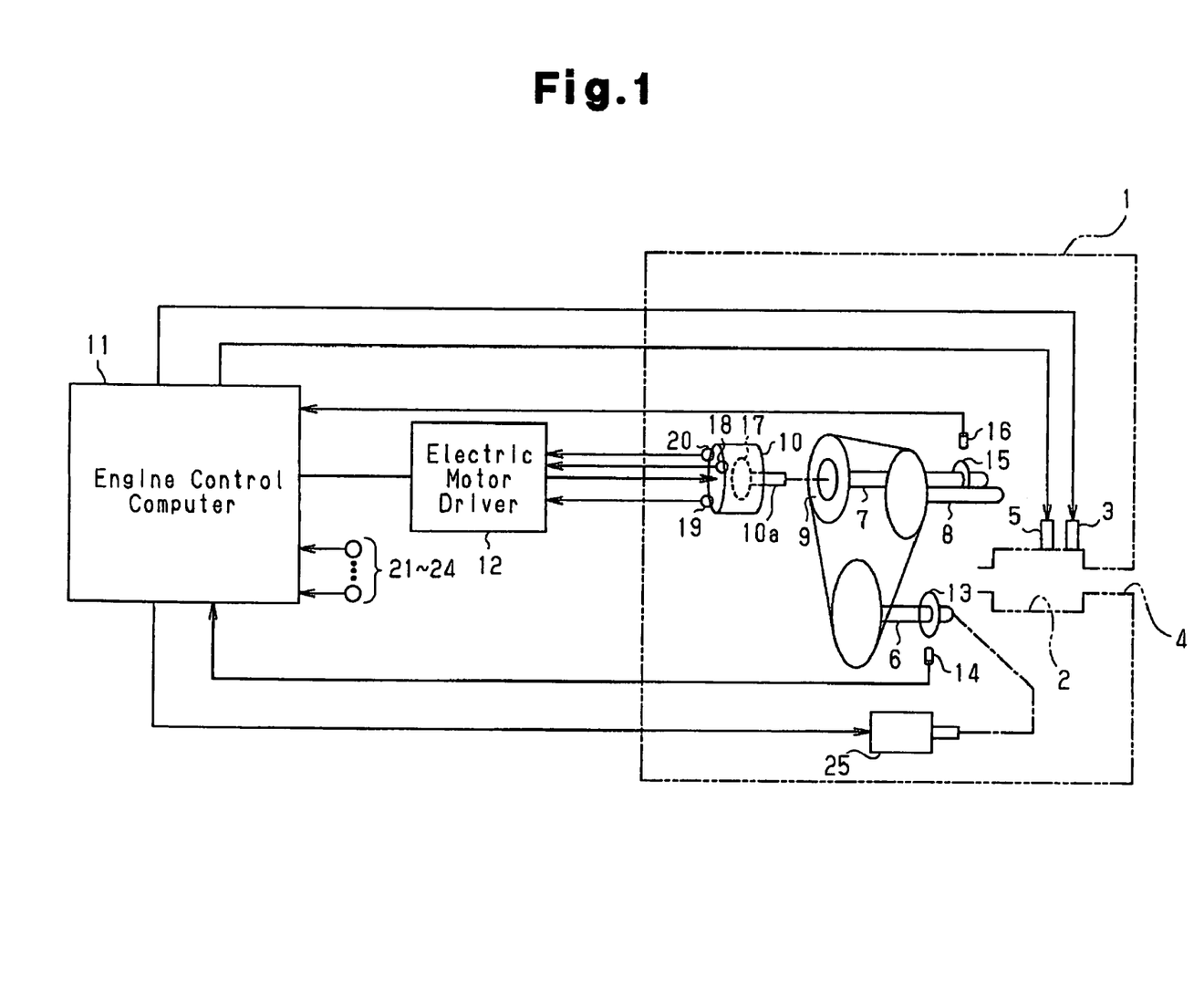
FIG. 1 is a diagrammatic view illustrating an entire engine to which a control apparatus according to a preferred embodiment is applied.

As shown in FIG. 1, the engine 1 has a combustion chamber 2 into which fuel is injected from a fuel injection valve 3. Also, air is drawn into the combustion chamber 2 form an intake passage 4. The air-fuel mixture is ignited by an ignition plug 5. When such ignition of air-fuel mixture occurs so that the air-fuel mixture is burned, the combustion energy drives engine 1, in other words, rotates a crankshaft 6. The crankshaft 6 is connected to a starter 25 for cranking the shaft 6 when starting the engine 1.

Rotation of the crankshaft 6 is transmitted to an intake camshaft 7 and an exhaust camshaft 8. The rotation transmitted from the crankshaft 6 causes the camshafts 7, 8 to rotate 360° per 720° rotation of the crankshaft 6. The rotation of the intake camshaft 7 and the exhaust camshaft 8 open and close an intake valve and an exhaust valve of the engine 1.

The intake camshaft 7 is provided with a variable valve timing mechanism 9. The variable valve timing mechanism 9 changes the rotational phase of the intake camshaft 7 relative to the crankshaft 6, thereby advancing or retarding the valve timing of the intake valve. The variable valve timing mechanism 9 is an electric type having an electric motor 10. The electric motor 10 has an output shaft 10a coupled to the intake camshaft 7. The electric motor 10 is controlled to change the rotational phase of the intake camshaft 7 relative to the crankshaft 6. The electric motor 10 is a three-phase alternating current motor that includes an excitation coil wound about a motor rotor 17 coupled to the output shaft 10a, and armature coils for U-phase, V-phase, and W-phase wound about a stator (not shown). The output shaft 10a of the electric motor 10 is coupled to and integrally rotates with the intake camshaft 7.

The rotation speed of the output shaft 10a is increased or decreased by controlling the electric motor 10. When the rotation speed of the output shaft 10a is set higher than the rotation speed of the intake camshaft 7, the rotation speed of the intake camshaft 7 is increased so that the rotational phase of the intake camshaft 7 is advanced relative to that of the crankshaft 6. As a result, the valve timing of the intake valve is advanced. When the rotation speed of the output shaft 10a is set lower than the rotation speed of the intake camshaft 7, the rotation speed of the intake camshaft 7 is reduced so that the rotational phase of the intake camshaft 7 is retarded relative to that of the crankshaft 6. As a result, the valve timing of the intake valve is retarded.

Next, a detection device for detecting rotation states of rotary shafts of the engine 1 including the crankshaft 6, the intake camshaft 7, and the output shaft 10a of the electric motor 10 will now be described.

A crank rotor 13 is attached to the crankshaft 6, and a crank position sensor 14 is located in the vicinity of the crank rotor 13. When the crank rotor 13 rotates as the crankshaft 6 rotates, the crank position sensor 14 outputs a crank signal shown in section (a) of FIG. 2. As shown in section (a) of FIG. 2, when the crankshaft 6 rotates, the crank position sensor 14 outputs the crank signal having pulses every time the crank angle advances 10°. That is, the shape of the crank rotor 13 and the position of the crank position sensor 14 are determined such that the crank signal having thus described equal intervals is generated. The crank signal output by the crank position sensor 14 is used for obtaining the rotation speed of the engine 1.

A cam rotor 15 is attached to the intake camshaft 7, and a cam position sensor 16 is located in the vicinity of the cam rotor 15. When the cam rotor 15 rotates as the intake camshaft 7 rotates, the cam position sensor 16 outputs a cam signal shown by a solid line in section (b) of FIG. 2. As shown in section (b) of FIG. 2, when the intake camshaft 7 rotates, the cam position sensor 16 outputs the cam signal having pulses at approximately 0°, 180°, 360° of crank angle. That is, the shape of the cam rotor 15 and the position of the cam position sensor 16 are determined such that the cam signal having thus described unequal intervals is generated. The cam signal output by the cam position sensor 16 is used for distinguishing the cylinders of the engine 1 and detecting the valve timing of the intake valve.

The electric motor 10 has three rotation sensors, or first to third rotation sensors 18 to 20 provided about the motor rotor 17 attached to the output shaft 10a and equally spaced from one another. When the motor rotor 17 rotates along with rotation of the output shaft 10a, which rotates integrally with the crankshaft 6 and the intake camshaft 7, the first to third rotation sensors 18 to 20 each output a square signal corresponding to induced voltage generated by the rotation as shown in sections (c) to (e) of FIG. 2. As shown in sections (c) to (e) of FIG. 2, each of the square signals output by the first to third rotation sensors 18 to 20 repeats rising edges and falling edges every 90° of crank angle. The square signals are displaced by 60° of crank angle from one another. The signals from the first to third rotation sensors 18 to 20 are used for obtaining the rotation speed and rotational position of the motor 10 (the output shaft 10a) when the motor 10 is controlled for varying the valve timing of the intake valves.

The electric configuration of a control apparatus for the engine 1 will now be described with reference to FIG. 1.

The control apparatus includes an engine control computer 11 that executes control processes for the engine 1 such as a fuel injection control, an ignition timing control, an intake valve timing control, and a control process for the starter 25. The engine control computer 11 includes a CPU that executes computation processes related to control of the engine 1, a ROM storing programs and data necessary for the controls, a RAM for temporarily storing the computation results of the CPU, and input and output ports for inputting and outputting signals from and to the outside.

As well as the crank position sensor 14 and the cam position sensor 16, various sensors are connected to the engine control computer 11. The sensors include:

an accelerator pedal position sensor 21 for detecting the depression degree of an accelerator pedal, which is depressed by a driver of the vehicle;

a throttle position sensor 22 for detecting the open degree of a throttle valve located in the intake passage 4 of the engine 1;

an airflow meter 23 for detecting the flow rate of air drawn into the combustion chamber 2 through the intake passage 4; and an ignition switch 24, which is switched to any of four switching positions including "off", "accessory", "on", and "start" and outputs a signal corresponding to the current switching position.

The engine control computer 11 is connected to an electric motor driver 12 for driving the electric motor 10. The motor driver 12 is connected to the first to third rotation sensors 18 to 20. The engine control computer 11 outputs command signals to the motor driver 12, thereby controlling the electric motor 10. Upon receiving the signals shown in sections (c) to (e) of FIG. 2 from the first to third rotation sensors 18 to 20, the motor driver 12 outputs the signals to the engine control computer 11.

The engine control computer 11 acquires the engine operating state based on detection signals from the above described sensors. According to the acquired engine operating state, the engine control computer 11 operates the fuel injection valve 3, the ignition plug 5, and the electric motor 10, thereby executing the fuel injection control for the fuel injection valve 3, the ignition timing control for the ignition plug 5, and the intake valve timing control. When controlling the electric motor 10 for controlling the intake valve timing, the engine control computer 11, based on the signals from the rotation sensors 18 to 20, acquires the current driving state of the electric motor 10, that is, the rotation speed and the rotational position of the output shaft 10a. The engine control computer 11 drives the electric motor 10 by taking the current driving state into consideration. The current driving state is taken into consideration when driving the electric motor 10 for properly driving the electric motor 10.

Next, starting and stopping of the engine 1 will be described.

In general, starting and stopping of the engine 1 are performed through control of the starter 25 and control of the fuel injection and ignition by the engine control computer 11 based on the operation of the ignition switch 24.

That is, when an occupant of the automobile turns the ignition switch 24 from "off" through "accessory" and "on" to "start" with the engine stopped, a starting command for the engine 1 is generated as the ignition switch 24 is turned to "start", and cranking of the engine 1 is started through activation of the starter 25. During cranking, fuel and air is supplied to the combustion chamber 2 and air-fuel mixture is ignited, so that the autonomous operation of the engine 1 is started. After the autonomous operation of the engine 1 has been started, the ignition switch 24 is turned to "on", and cranking by activation of the starter 25 is stopped.

Also, when the occupant of the automobile turns the ignition switch 24 from "on" through "accessory" to "off" with the engine running, fuel injection from the fuel injection valve 3 and ignition by the ignition plug 5 are stopped as the ignition switch 24 is turned to "accessory". Then, combustion of the air-fuel mixture is no longer performed, thus stopping the engine 1. Since the ignition switch 24 is generally turned from "on" to "accessory" during idling, after the process for stopping the engine 1 is started as described above, the engine rotation speed is gradually reduced from the idle rotation speed due to the rotational resistance caused by the pressure in the combustion chamber 2 during the compression stroke. Finally, the engine 1 rotates in reverse once due to the pressure in the combustion chamber 2, and then the engine rotation is stopped.

The engine 1 is also stopped unexpectedly for abnormality besides the above mentioned normal operation stop. For example, during cranking for starting the engine and before starting the autonomous operation, when the ignition switch 24 is undesirably turned from "start" to "on" due to operational error of the ignition switch 24, the engine 1 is abnormally stopped before achieving the autonomous operation. Furthermore, under a circumstance where the engine 1 is in the autonomous operation, the engine 1 may stall for some reason.

When such an abnormal stopping of the engine occurs, fuel injection and ignition are continued in order to achieve autonomous operation while the engine rotation speed is reduced in the engine stopping process. As a result, fuel injection and ignition are performed even during reverse rotation of the engine 1 in the engine stopping process. This could lead to failure of the engine 1 by combustion of fuel during reverse rotation. In order to suppress such failure, it is desirable to detect reverse rotation of the engine 1, and prohibit ignition when the occurrence of reverse rotation is detected. To detect reverse rotation of the engine 1, for example, a method described in BACKGROUND OF THE INVENTION may be employed. However, in the method for detecting reverse rotation described in BACKGROUND OF THE INVENTION, an additional cam rotor or crank position sensor need to be provided to promptly detect reverse rotation after the occurrence of reverse rotation. Such addition is inevitably troublesome and costly.

Therefore, in the preferred embodiment, reverse rotation of the engine 1 is detected using signals from the first to third rotation sensors 18 to 20. In this method of detecting the occurrence of reverse rotation, since the first to third rotation sensors 18 to 20, which are existing components, provided on the electric motor 10 are used to control the electric motor 10 of the variable valve timing mechanism 9, the occurrence of reverse rotation is detected without providing additional sensors or rotors.

Next, detection of reverse rotation of the engine 1 using signals from the first to third rotation sensors 18 to 20 will be described with reference to the timing chart of FIG. 2.

The horizontal axis of the timing chart represents variation of the crank angle during forward rotation of the engine 1. The crank angle is determined based on the crank signal shown in section (a) of FIG. 2 and the cam signal shown in section (b) of FIG. 2.

Figure 2:
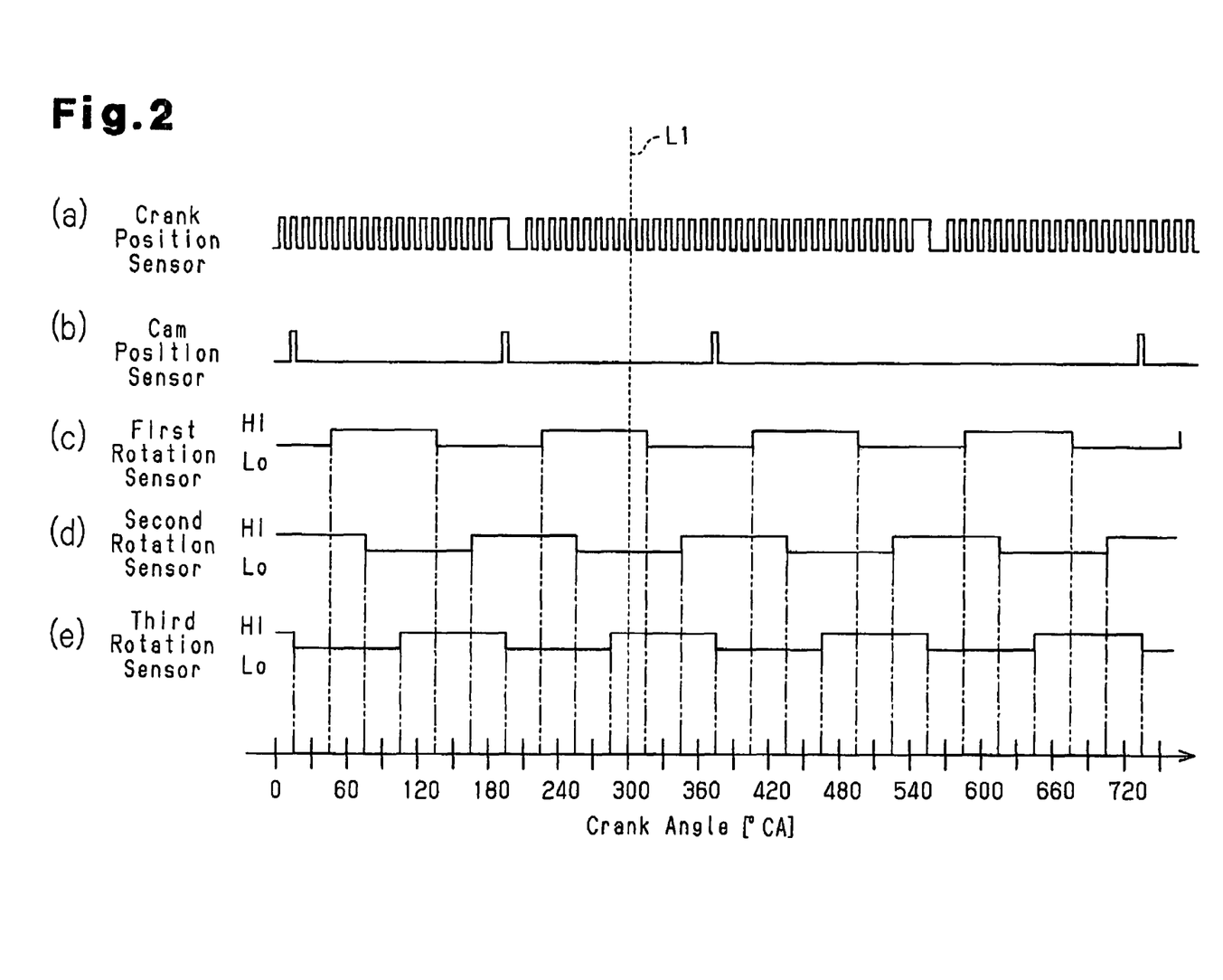
FIG. 2 is a timing chart showing a situation where a crank angle changes, in which section (a) shows a crank signal from a crank position sensor, section (b) shows a cam signal from a cam position sensor, and sections (c), (d), and (e) show signals from first to third rotation sensors.

The output patterns of the signals from the first to third rotation sensors 18 to 20 corresponding to the variation of the crank angle are as shown in sections (c) to (e) of FIG. 2. As shown in sections (c) to (e) of FIG. 2, each of the signals output by the first to third rotation sensors 18 to 20 repeats rising edges and falling edges every 90° of crank angle. The signals are displaced by 60° of crank angle from one another. This is because the rotation sensors 18 to 20 are arranged about the motor rotor 17 at equal intervals. As described above, the rising edges and falling edges of the signals occur at different timings per each rotation sensor, and more specifically, at relatively short intervals of 30° of crank angle. Therefore, the output patterns of the signals from the rotation sensors 18 to 20 during forward rotation of the engine 1 shows patterns in which the rising edges and the falling edges of the signals occur at different timings, in other words, patterns in which the rising edges and the falling edges occur at relatively short intervals of 30° of crank angle.

The theoretical rising timings and falling points in time of the signals from the rotation sensors 18 to 20 during forward rotation of the engine 1 are determined based on the crank signal. That is, in the case of the preferred embodiment, the rising edges and the falling edges occur at 15°, 45°, 75°, and so on, that is, every time the crank angle advances 30°. These points in time are determined as the theoretical rising and falling points in time. During forward rotation of the engine 1, the actual rising edges and falling edges of the signals occur at these theoretical points in time.

Reverse rotation of the engine 1 will now be considered with reference to a case where reverse rotation of the engine 1 is started at, for example, 300° of the crank angle.

Assume that the engine 1 is rotated in reverse when the crank angle becomes 300° during forward rotation of the engine 1. In this case, the output pattern of the crank signal and the output pattern of signals from the rotation sensors 18 to 20 thereafter show patterns in which the output patterns before the crank angle 300° are reversed relative to a broken line L1 in FIG. 2.

Since the crank signal is output at equal intervals during forward rotation (every 10° of crank angle), even if the output pattern of the crank signal is reversed relative to the broken line L1 due to reverse rotation, the output pattern hardly changes from that during forward rotation. Therefore, the current crank angle is determined based on the crank signal in the same manner as during forward rotation even after reverse rotation, and the points in time where the determined crank angle becomes 15° CA, 45° CA, 75° CA . . . are determined as the theoretical rising and falling points in time of the signals from the rotation sensors 18 to 20.

Figure 3:
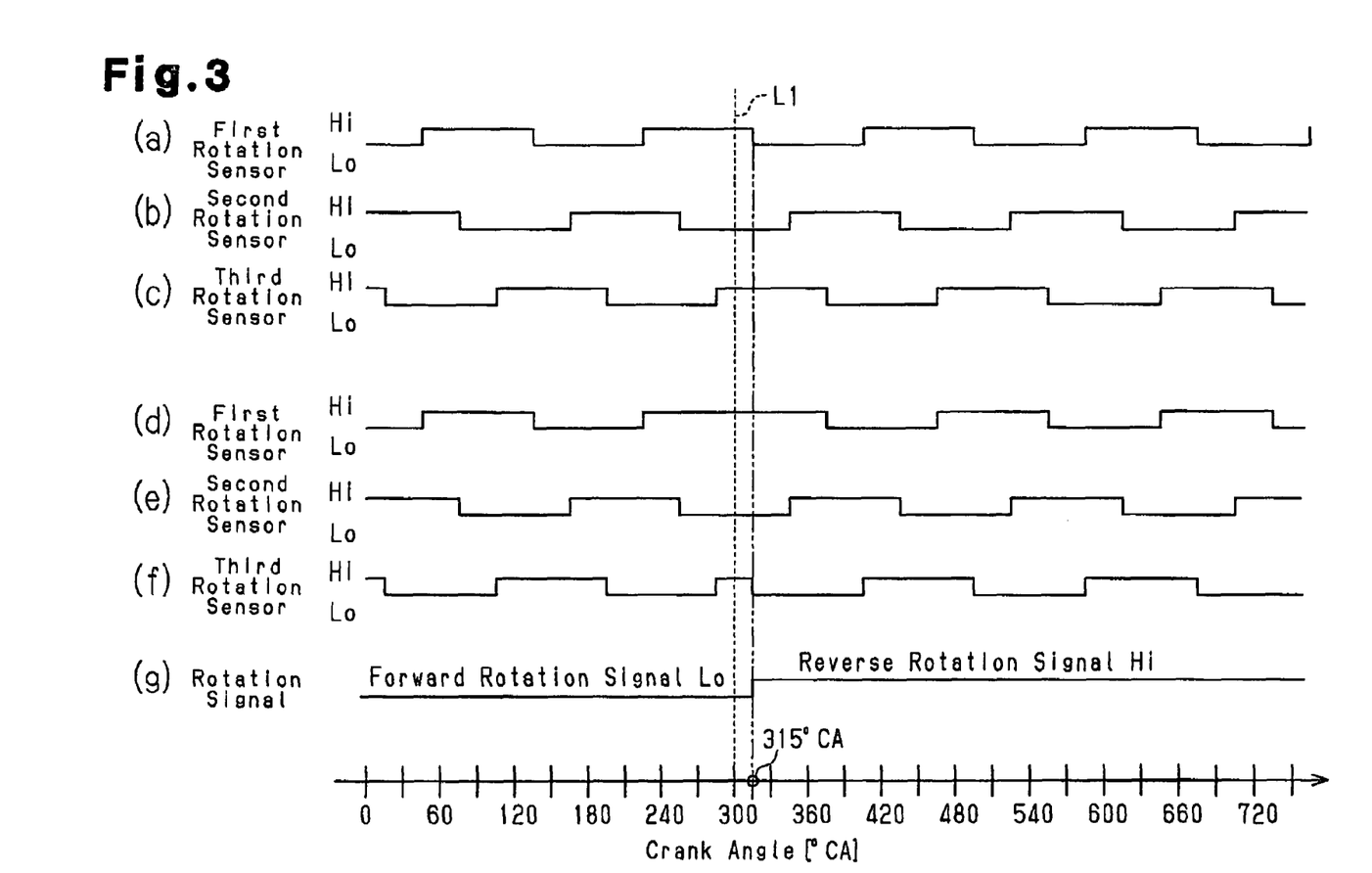
FIG. 3 is a timing chart in which sections (a), (b), and (c) show signals from first to third rotation sensors during forward rotation of the engine, sections (d), (e), and (f) show signals from the first to third rotation sensors during reverse rotation of the engine, and section (g) shows the waveform of forward and reverse rotation signals output from an electric motor driver.

Meanwhile, the output patterns of the signals from the rotation sensors 18 to 20 change as shown in the timing chart of FIG. 3 as forward rotation shifts to reverse rotation. Sections (a) to (c) of FIG. 3 show the output pattern of signals from the first to third rotation sensors 18 to 20 during forward rotation. When the engine 1 rotates in reverse at 300° of crank angle, the signal output pattern thereafter shows the output pattern as shown in sections (d) to (f) of FIG. 3 due to reverse rotation of the motor rotor 17, that is, the output pattern in which the output pattern before 300° of crank angle is reversed relative to a broken line L1 in FIG. 3.

In the preferred embodiment, when the output patterns of the signals from the first to third rotation sensors 18 to 20 become different from the those during forward rotation due to reverse rotation of the engine 1, reverse rotation of the engine 1 is detected accordingly.

The rising edges and the falling edges of the signals occur at relatively short intervals of 30° of crank angle during forward rotation of the engine 1. Therefore, when the engine 1 rotates in reverse, the rising and falling timings of the signals become different from those during forward rotation, that is, the output patterns of the signals are promptly changed. Therefore, the occurrence of reverse rotation is detected promptly based on the variation of the output pattern.

Figure 4:
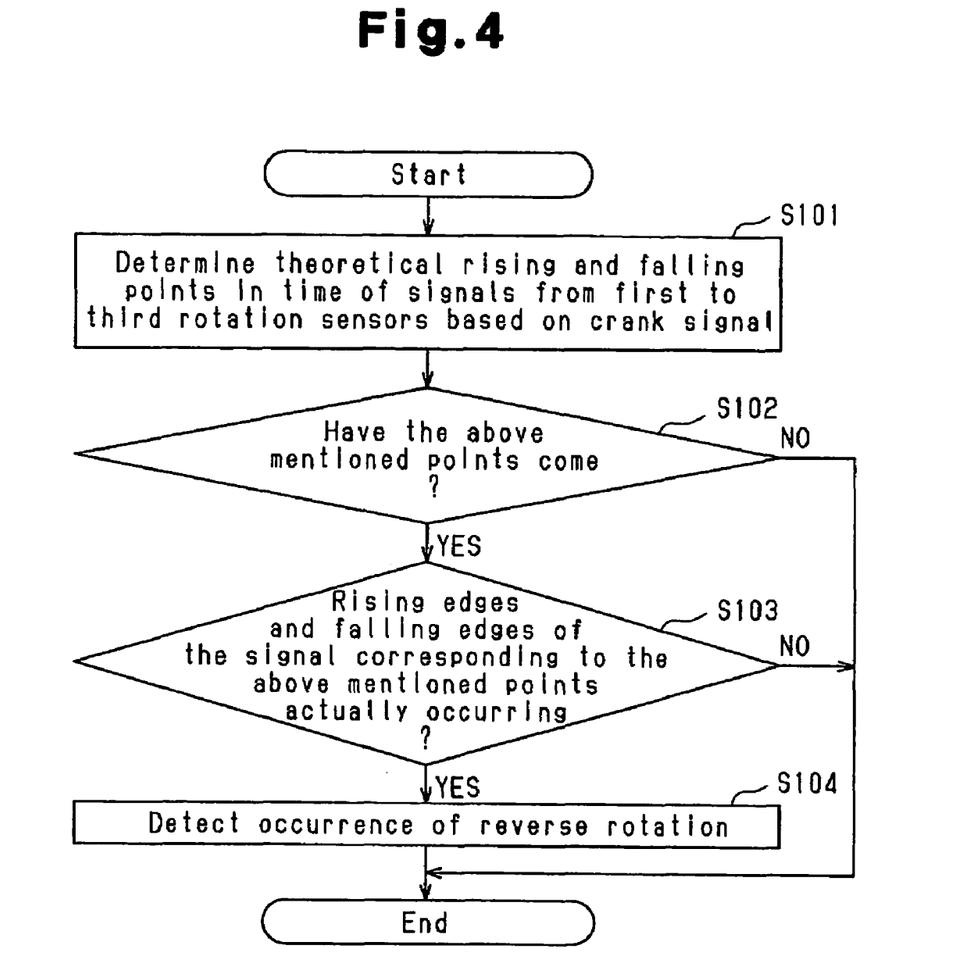
FIG. 4 is a flowchart showing a procedure for detecting the occurrence of reverse rotation of the engine.

More specifically, reverse rotation is detected based on the variation of the output pattern as follows in accordance with the procedure shown in the flowchart of FIG. 4.

That is, as described above, during either forward rotation or reverse rotation of the engine 1, the crank angle is determined based on the crank signal, and the points in time when the crank angle becomes 15° CA, 45° CA, 75° CA . . . are determined as the theoretical rising and falling points in time of the signals from the rotation sensors 18 to 20 (S101).

When, for example, reverse rotation of the engine 1 occurs at 300° of crank angle, the point in time where the crank angle determined based on the crank signal becomes 315° is determined to correspond to the theoretical rising and falling points in time of the signals from the rotation sensors 18 to 20. During forward rotation of the engine, when the time (315° CA) determined as described above comes, the rising edge or the falling edge of the corresponding signal (in this case, the falling edge of the signal from the first rotation sensor 18 (see section (a) of FIG. 3)) actually occurs. However, when the engine 1 rotates in reverse, the output patterns of the signals from the rotation sensors 18 to 20 change from the state during forward rotation. Therefore, even if the time (315° CA) comes, the rising edge or the falling edge of the corresponding signal does not occur (see section (d) of FIG. 3).

The existence of such phenomenon is determined based on, when the time comes, that is, when the decision outcome of step S102 is positive, whether the rising edge or the falling edge of the corresponding signal actually occurs (S13). That is, if the rising edge or the falling edge of the corresponding signal does not actually occur at this point in time, that is, when the decision outcome of step S103 is positive, the above mentioned phenomenon is occurring. When this phenomenon occurs, the occurrence of reverse rotation of the engine 1 is detected (S104).

The above described detection of reverse rotation using the output patterns of the signals from the rotation sensors 18 to 20 is performed by the motor driver 12. When the occurrence of reverse rotation of the engine 1 is detected, a reverse rotation signal "Hi" is output from the motor driver 12 to the engine control computer 11 as shown in section (g) of FIG. 3. Also, when the occurrence of reverse rotation of the engine 1 is not detected, a forward rotation signal "Lo" is output from the motor driver 12 to the engine control computer 11.

Figure 5:
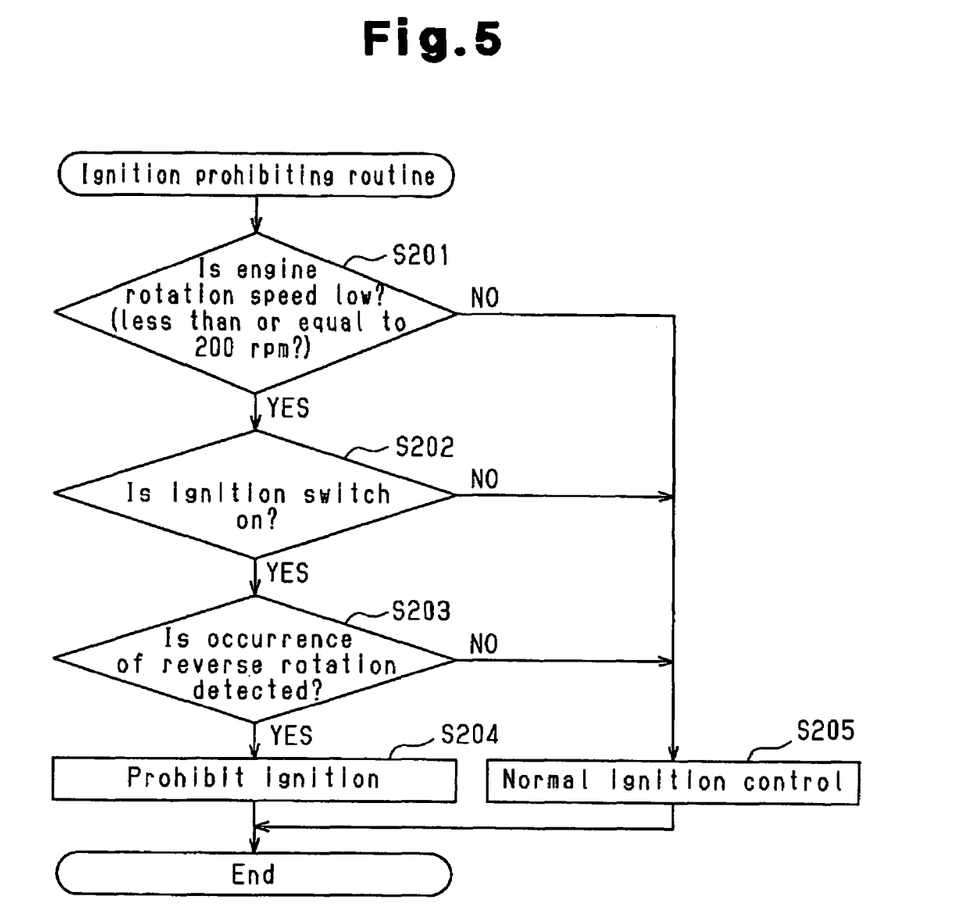
FIG. 5 is a flowchart showing a procedure for prohibiting ignition during reverse rotation of the engine.

The procedure for prohibiting ignition during the occurrence of reverse rotation of the engine 1 will now be described with reference to the flowchart of FIG. 5, which shows an ignition prohibiting routine. The ignition prohibiting routine is executed as an interrupt by the engine control computer 11, for example, at predetermined time intervals.

In this routine, at step S201, the engine control computer 11 determines whether the engine rotation speed is less than the idle rotation speed, and is less than or equal to a level (for example, 200 rpm) that could stop the engine rotation. Circumstances where the decision outcome becomes positive include a case where the engine rotation speed is reduced during a normal stopping process or an abnormal stopping process of the engine 1. When the decision outcome of step S201 is positive, the engine control computer 11 proceeds to step S202. At step S202, the engine control computer 11 determines whether the ignition switch 24 is "on". When the decision outcome of step S202 is positive, the decrease of the engine rotation speed is caused during the abnormal stopping process of the engine 1. When the decision outcome of step S202 is positive, the engine control computer 11 proceeds to step S203. At step S203, based on whether the reverse rotation signal "Hi" is output from the motor driver 12, the engine control computer 11 determines whether the occurrence of reverse rotation of the engine 1 is detected. When the decision outcome of step S203 is positive, the engine control computer 11 proceeds to step S204 and prohibits ignition.

Therefore, when reverse rotation of the engine 1 is caused, since ignition of the engine 1 is prohibited, the engine 1 is suppressed from failing due to combustion of fuel in the reverse rotation state. Meanwhile, when the decision outcome of any of steps S201 to S203 is negative, the engine control computer 11 proceeds to step S205 and executes the ignition control as in the normal state. That is, when the engine 1 is stopped in the normal state by turning the ignition switch 24 from "on" through "accessory" to "off", ignition is stopped. In other cases, ignition is executed except when reverse rotation is caused during the abnormal stopping process of the engine 1. Therefore, during cranking or autonomous operation, even if the engine rotation speed is reduced to below the idle rotation speed due to abnormal stopping of the engine 1, ignition is continued until the engine 1 is rotated in reverse. If ignition is prohibited during this period, the possibility of achieving the autonomous operation of the engine 1 is eliminated, and the engine is stopped although there is a possibility that the engine 1 may achieve the autonomous operation if ignition is continued. However, by continuing ignition as described above, the engine is suppressed from being stopped because the ignition is prohibited more than necessary during this period.

The above described embodiment has the following advantages.

(1) To detect the occurrence of reverse rotation of the engine 1, the first to third rotation sensors 18 to 20 are used that are provided on the electric motor 10 for driving the variable valve timing mechanism 9. The rotation sensors 18 to 20 are provided for controlling the electric motor 10 to execute the intake valve timing control. Since the existing sensors, which are the first to third rotation sensors 18 to 20, are used to detect the occurrence of reverse rotation of the engine 1, additional sensors or rotors do not need to be provided to detect the occurrence of reverse rotation.

(2) The first to third rotation sensors 18 to 20 are provided about the motor rotor 17 at equal intervals, and the rising edges and falling edges of the signal from the sensor 18 occur at relatively short intervals of 30° of crank angle during forward rotation of the engine 1. During reverse rotation of the engine 1, the timing of the rising edges and falling edges of the signal becomes different from that during forward rotation due to reverse rotation, that is, the output pattern of the signal is promptly varied. Therefore, based on the change of the output pattern, the occurrence of reverse rotation is promptly detected.

(3) Whether the output patterns of the signals from the first to third rotation sensors 18 to 20 are changed from those during forward rotation is determined based on whether the rising edges and falling edges of the signals actually occur at the theoretical rising and falling points in time of the signals that are determined based on the crank signal. When reverse rotation occur, the rising edges and falling edges of the corresponding signal do not actually occur even if the above mentioned points in time come. Therefore, based on the above mentioned judgment, the variation of the output patterns of the signals from the rotation sensors 18 to 20 from the state during forward rotation, in other words, the occurrence of reverse rotation of the engine 1 is accurately detected.

(4) Since reverse rotation of the engine 1 is promptly detected after its the occurrence as described in (2), ignition of the engine 1 is promptly prohibited when the occurrence of reverse rotation is detected. Therefore, when reverse rotation of the engine 1 occurs, failure of the engine 1 due to combustion of fuel in the reverse rotation state is suppressed.

(5) When an abnormal stop occurs during operation of the engine 1 such as cranking or autonomous operation, even if the engine rotation speed is reduced to less than or equal to the level (for example, 200 rpm) that could stop the engine rotation, ignition is continued until reverse rotation of the engine 1 occurs. If ignition is prohibited during this period, the possibility of achieving the autonomous operation during this period is eliminated. However, by continuing ignition as described above, the engine 1 is prevented from being stopped because ignition is prohibited more than necessary during the above mentioned period.

The above described embodiment may be modified as follows.

The determination for whether the output patterns of the signals from the first to third rotation sensors 18 to 20 are changed from the those during forward rotation may be made using a method other than that described in (3). For example, the state of the signal from each of the rotation sensors 18 to 20 ("Hi" or "Lo") at a given crank angle may be compared with the state during forward rotation of the engine 1. In this case, if the state of the signal differs from that during forward rotation, the output pattern of the signal is detected to be changed from that during forward rotation, in other words, the occurrence of reverse rotation of the engine 1 is detected.

The electric motor 10 of the variable valve timing mechanism 9 is exemplified as the rotating electrical machine coupled to the crankshaft and the camshaft, but the present invention is not limited to this. For example, a generator, which is typically coupled to an engine crankshaft, may be used as the rotating electrical machine. In the engine mounted on a hybrid automobile, a motor is coupled to the crankshaft to assist the engine. Such a motor of a hybrid automobile may be used as the rotating electrical machine.

The crank position sensor 14 and the crank rotor 13 do not need to be provided in the vicinity of the crankshaft 6, but may be provided in the vicinity of, for example, the exhaust camshaft 8 to detect the rotation state of the crankshaft 6 based on rotation of the exhaust camshaft 8.

The invention claimed is:

1. A control apparatus for an internal combustion engine, the engine including a crankshaft, a camshaft for actuating a valve of the engine, and a rotating electrical machine that is coupled to one of the crankshaft and the camshaft, the apparatus comprising a computer that controls the rotating electrical machine:
    wherein the rotating electrical machine includes a rotor and a plurality of rotation sensors, each of which outputs a signal corresponding to induced voltage generated by rotation of the rotor, and
    wherein the computer controls the rotating electrical machine based on the signals from the rotation sensors, and detects the occurrence of reverse rotation in the engine when an output pattern of the signals from the rotation sensors is different from an output pattern during forward rotation of the engine.

2. The apparatus according to claim 1, wherein the engine further includes a crank position sensor, which outputs a crank signal every time the crankshaft rotates by a certain angle,
    wherein the computer determines theoretical rising and falling points in time of the signal from each rotation sensor during forward rotation of the engine based on the crank signal, determines whether rising and falling edges of the signal from each rotation sensor are actually occurring at the theoretical rising and falling points in time, and detects the occurrence of reverse rotation in the engine when the rising and falling edges of the signals are not occurring at the theoretical rising and falling points in time.

3. The apparatus according to claim 2, wherein the rotation sensors include three rotation sensors, each rotation sensor outputs a signal that repeats rising and falling edges every time the crankshaft rotates by 90°, and the signals are displaced by 60° of crank angle from one another.

4. The apparatus according to claim 1, wherein the engine includes an ignition plug for igniting air-fuel mixture,
    wherein, when the computer detects the occurrence of reverse rotation in the engine, the computer prohibits ignition of the air-fuel mixture by the ignition plug.

5. The apparatus according to claim 4,
    wherein, when the engine is in an abnormal stopping process, the computer continues igniting the air-fuel mixture by the ignition plug until the computer detects the occurrence of reverse rotation in the engine.

6. The apparatus according to claim 1, wherein the engine includes a variable valve timing mechanism, which changes the relative rotational phase between the camshaft and the crankshaft, the rotating electric machine is an electric motor coupled to the camshaft, and the computer changes the relative rotational phase by controlling the electric motor.

7. A control method for an internal combustion engine, the engine including a crankshaft, a camshaft for actuating a valve of the engine, a rotating electrical machine that is coupled to one of the crank shaft and the camshaft, the method comprising:
    outputting, from a plurality of rotation sensors, signals corresponding to induced voltage generated by rotation of a rotor of the rotating electrical machine;
    controlling the rotating electrical machine based on the signals from the rotation sensors; and
    detecting the occurrence of reverse rotation in the engine when an output pattern of the signals from the rotation sensors is different from an output pattern during forward rotation of the engine.

8. The method according to claim 7, further comprising:
    outputting a crank signal from a crank position sensor every time the crank shaft rotates by a certain angle;
    determining theoretical rising and falling points in time of the signal from each rotation sensor during forward rotation of the engine based on the crank signal;
    determining whether rising and falling edges of the signal from each rotation sensor are actually occurring at the theoretical rising and falling points in time; and
    detecting the occurrence of reverse rotation in the engine when the rising and falling edges of the signals are not occurring at the theoretical rising and falling points in time.

9. The method according to claim 8, wherein the rotation sensors include three rotation sensors, each rotation sensor outputs a signal that repeats rising and falling edges every time the crank shaft rotates by 90°, and the signals are displaced by 60° of crank angle from one another.

10. The method according to claim 7, further comprising:
    igniting air-fuel mixture by an ignition plug; and
    prohibiting ignition of the air-fuel mixture by the ignition plug when the occurrence of reverse rotation in the engine is detected.

11. The method according to claim 10, further comprising continuing, when the engine is in an abnormal stopping process, ignition of the air-fuel mixture by the ignition plug until the occurrence of reverse rotation in the engine is detected.

12. The method according to claim 7, wherein the engine includes a variable valve timing mechanism, which changes the relative rotational phase between the camshaft and the crankshaft, the rotating electric machine is an electric motor coupled to the camshaft, and the relative rotational phase is changed by controlling the electric motor.

* * * * *